May 29, 1923.                                                              1,456,558
A. T. M. JOHNSON
PICTURE FILM FOR COMBINED CINEMATOGRAPH AND PHONOGRAPH PRODUCTION
Filed April 26, 1921
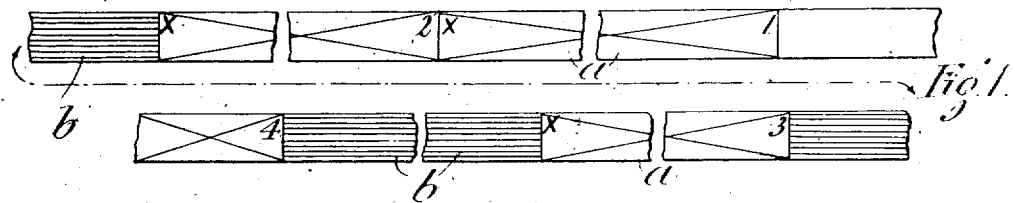
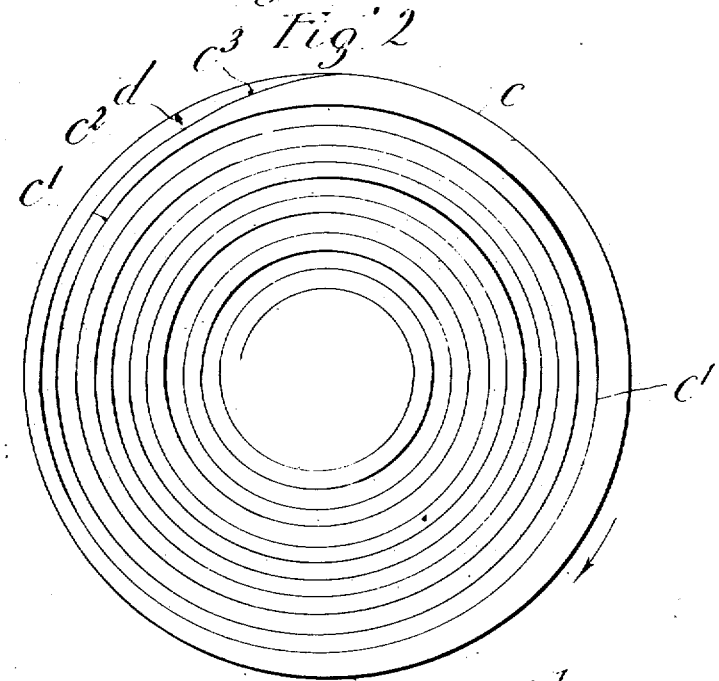
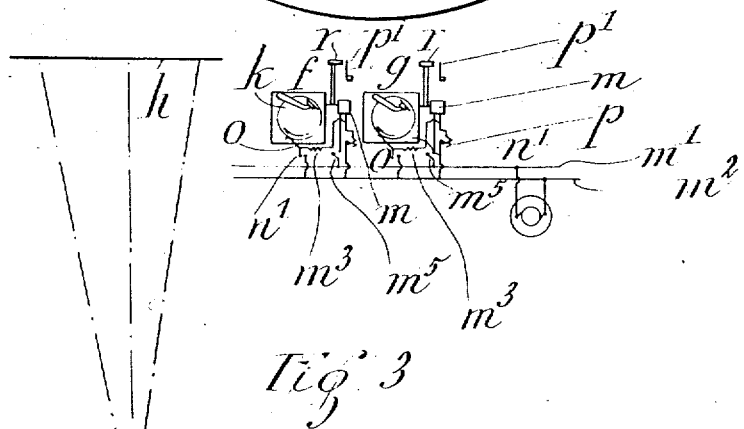
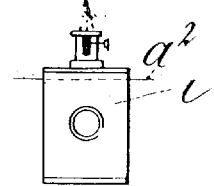
Inventor
Arthur T. M. Johnson
By Julian C. Dowell
his Attorney Patented May 29, 1923.

1,456,558

UNITED STATES PATENT OFFICE.

ARTHUR THOMAS METCALF JOHNSON, OF STREATHAM, LONDON, ENGLAND.

PICTURE FILM FOR COMBINED CINEMATOGRAPH AND PHONOGRAPH PRODUCTION.

Application filed April 26, 1921. Serial No. 464,519.

*To all whom it may concern:*

Be it known that I, ARTHUR THOMAS METCALF JOHNSON, a subject of the King of Great Britain and Ireland, residing at Streatham, in the county of London, England, have invented Picture Films for Combined Cinematograph and Phonograph Production, of which the following is a specification.

Many attempts have heretofore been made to combine the use of a gramophone or equivalent machine (hereinafter included in the term gramophone) with the display of cinematograph pictures on a screen with the object of representing the supposed voice of an actor in the picture by corresponding voice reproductions by the gramophone. None of such attempts have heretofore been satisfactory owing to the difficulty of making the voice reproduction synchronize with the assumed action of the actor or actors in the pictures.

The object of the present invention is to overcome this difficulty.

To this end, portions of a picture film preceding and following that portion representing an actor or actors in the act of speaking, reading or singing, are each provided with indicating devices by the aid of which a gramophone can be brought into action and stopped, at the required times, to reproduce the supposed speech of the actor or actors depicted in a speaking portion of the film displayed on a screen, the sound record disc or equivalent of the gramophone (hereinafter referred to as a sound record disc) being provided with one or more voice records, specially prepared, as hereinafter described, that will be reproduced in synchronism with the action of the actor or actors in the said depicted speaking portion of the film. The indicating devices may conveniently be in the form of characteristic marks or signs that will be projected on the screen slightly in advance of and behind the pictures on the film forming with the two portions of the film bearing the indicating devices, a speaking portion of the film, one of such indicating devices, namely the forward one, serving to indicate to an operator the moment when the gramophone is to be set in operation to reproduce thereby a voice record or records corresponding to the speech or speeches supposed to made by the actor or actors depicted in the said speaking portion of the film, and the other indicating device, namely the rearward one serving to indicate to the operator when the gramophone is to be stopped corresponding with the termination of the assumed speech or speeches of the actor or actors in the speaking portion of the film, or to a suitable time thereafter. Thus, what may be called for brevity and distinction, the speaking sections of a picture film, are marked off from each other and from the remaining portion or portions of the picture film, if any, representing inarticulate actors or inanimate objects, each speaking section having a characteristic mark, say a numeral or letter, at the commencement thereof, to indicate when the gramophone is to be set in action to reproduce the voice of the actor or actors afterwards represented in such section, and another characteristic mark, say a cross, circle or equivalent, at the termination of the section, to indicate when the gramophone is to be stopped, when the actor or actors is or are supposed to have finished speaking. The successive speaking sections of the film may be numbered consecutively.

It will be understood that in order that the starting and stopping indications on each speaking section of film in front and in rear respectively of the successive pictures on the section, shall be readily seen when projected on the screen, each starting indication will of course consist of a succession of similar figures arranged at the commencement of the speaking section of the film and in advance of the series of pictures in the section and corresponding to the number of the section, so that when they are projected on the screen, they will, owing to persistence of vision, appear, for a short time on the screen, as a single figure. For a like reason, each stopping indication on the speaking section of film and at the end of the series of pictures therein, will consist of a succession of similar devices, say crosses. The said indicating devices are of course produced photographically on the film like the pictures thereon.

The starting figures and stopping indications on the portions of film at the beginning and end of the series of pictures in each speaking section of film, will be of such size that when projected on the screen, they can be readily seen by a gramophone attendant watching for them but will not readily attract the attention of an audience. The said figures and indications may, for this purpose, be arranged to be near one edge of the pieces of film bearing them. the remaining portion of such pieces of film being blank.

As will be understood, the several speaking sections will usually be of varying length and may be numbered consecutively.

Old or existing films can be readily sectionized in the manner described, to adapt them to be used in conjunction with voice record discs in the manner hereinbefore explained.

In order that the voice reproduction shall, as far as possible, synchronize with the supposed speaking of an actor in a speaking section of the picture film, the voice record or successive voice records on a sound record disc for the particular section, is or are first made on a gramophone recording disc or equivalent device by a person representing an actor in the speaking section, and hereinafter called the speaker, seated or standing in front of the speech recording device and watching the picture display on a screen from a sectionized picture film made as described, the speech recording device being started immediately a starting indication mark appears on the screen, and the speaker commencing to speak into the recording device, shortly afterwards, the words the actor in the speaking section is supposed to be speaking and synchronously therewith. In this way, the speaker has time after receiving the signal to commence speaking at the required moment. When the stopping indication appears on the screen, it is an indication that the speaking section is ended and that the recording device should be stopped. The speaker should speak at a rate to suit the assumed rate of speaking and action of the actor in the picture. The starting and stopping of the speech recording device may be effected simultaneously with the appearance of the starting and stopping marks respectively on the screen, either by the speaker or by another person. This mode of making a speech record or records on a voice recording device is repeated each time a speaking section of film, marked as described, is displayed on the screen, a separate recording device being used for each speaking section of film.

The speed of the picture film and of the speech recording device are suitably timed to ensure correspondence between the speech recording and the supposed speaking of the actor in the picture. Conveniently, the picture film operating mechanism and the speech recording device are driven by electric motors, the speed of each of which should be carefully regulated, to obtain and maintain the required relative rates of speed between the two motors to ensure the obtaining of the desired result. The gramophone recording device, usually in the form of a disc, is provided with a starting or zero mark or indication from which the record groove cut in such disc by a stylus cutter, will commence to be formed when the disc is set in motion. Each speaking section of film is made of such a length and the speech recording disc is made of such a size, that the disc will accommodate the record of the whole of the speech or successive speeches of the actor or actors in the particular speaking section of film being dealt with, together with any desired length of blank portions of groove before and after a speech record and groove between successive speech records, corresponding to periods when the actor or actors in the particular speaking section of film being dealt with, may not be speaking.

From a voice recording disc thus provided with a voice record or with successive voice records, and corresponding to a speaking section of the film, a voice reproducing device, usually in the form of a disc, can be made in the usual way, such voice reproducing device, herein called a voice record disc, bearing a corresponding voice record or corresponding voice records, with blank groove where desired.

For reproducing the voice record or records on each voice record disc thus made, a gramophone provided with such a voice record disc, is arranged in proximity to the screen on which the pictures are to be displayed and the gramophone with the voice record disc thereon, is started and stopped in accordance with the starting and stopping indications projected on the screen from the speaking section of the film being dealt with, so that the voice reproductions shall synchronize with the assumed speaking of the actor or actors being depicted in the said speaking section of film.

The picture film operating mechanism for the projecting lantern, and the gramophone for operating each sound record disc for a speaking section of film, used for exhibition purposes, may also conveniently be driven by electric motors, the speeds of which are carefully regulated to obtain and maintain the same relative rates of speed between them as between the motors used when making speech recording discs in the manner hereinbefore described.

In placing the voice record disc on the rotary table of the gramophone for use, it is important to ensure that a starting or zero mark on the disc shall be caused to register with the stylus of the sound reproducer of the gramophone, so that the reproduction of the speech, or of the first speech, recorded on the disc, shall commence at the required time after the disc starts in motion.

Usually it will be found advantageous to employ two gramophones for alternative use with successive recording discs, in order that such discs can be used in rapid succession without stopping the sectionized film. In like manner, it will be found advantageous to employ two gramophones for alternative use with successive voice record discs made as described. By this means, whilst the voice recording disc, or voice record disc, as the case may be, on one gramophone is in use for one speaking section of film, the next or second voice recording disc or voice record disc, for the next speaking action of film can be placed in position on the second gramophone in readiness for use when the first voice recording disc, or voice record disc, as the case may be, has been used.

Assuming successive speaking sections of the picture film are numbered consecutively, the voice record discs for use with the successive speaking sections of film may be numbered consecutively and be divided into two sets, those in one set bearing consecutive odd numbers and those in the other set bearing consecutive even numbers. The successive discs bearing odd numbers may then be used in succession on one gramophone for speaking sections bearing odd numbers and those in the second set be used in succession on the second gramophone for the speaking sections bearing even numbers.

As will be understood, the sound record on what is herein called the voice record disc, may represent the voice of two or more actors in a speaking section of a film, speaking together or successively, or the sound of one or more musical or other sound producing instruments or devices, such a voice record disc being made from a sound recording disc made under the conditions hereinbefore described. For the sake of brevity and to avoid repetition, each of these ways of producing sound, is herein included in the term "actor."

In the accompanying illustrative and diagrammatic drawings, Fig. 1 shows part of a sectonized picture film of the kind herein referred to. Fig. 2 shows in plan, a gramophone sound record disc of the kind herein referred to. Fig. 3 shows in plan, a combined cinematograph and phonograph production installation embodying the invention.

Referring to Fig. 1, $a$ represents the speaking sections of a picture film, as herein defined, and $b$ the non-speaking sections of the film. Each speaking section is provided at its commencement and before the successive pictures in such section, with a starting indication or number such as hereinbefore described, the successive speaking sections bearing the consecutive numbers 1, 2, 3, and so on as shown. Each speaking section of film is also provided at its termination, and behind the successive pictures in the said speaking section, with a stopping indication or symbol, represented, in the example, by the letter X. It is to be understood that the actor represented in each speaking section of the film may not be assumed to be speaking throughout the length of the section. He will not commence speaking until after the starting number has appeared on the screen and will have finished speaking before the stopping indication appears on the screen.

Fig. 2 represents a voice record disc $c$ made in the manner hereinbefore described, but to which no claim by itself is herein made $c^1$ being the record portion thereof containing a voice record, or a succession of voice records separated by blank portions of groove, corresponding to an assumed speech or assumed speeches of one or more actors, in the speaking section of film to which the sound record disc corresponds. There will also usually be a blank portion of groove in the disc before the commencement of the voice record, or the first voice record therein, and also after the voice record, or after the last of two or more voice records in the disc. $d$ is a zero or starting mark on the disc, conveniently in the form of a radial white or coloured line, corresponding to the point at which the cutter commenced to act in producing the sound recording disc from which the said voice producing or record disc $c$ is afterwards made. When placing the latter disc in position on the rotary gramophone table with which it is to be used, the stylus needle of the sound reproducer of the gramophone is placed upon the point $c^2$ of the record groove in the disc, opposite to the said zero or starting line or mark $d$, so that when the gramophone and disc are started, immediately upon the starting figure of the corresponding speaking section $a$ of a picture coming into view on the screen, the voice record on the disc will commence to be reproduced at the required moment to ensure synchronism with the assumed voice of the actor in the said speaking section. To avoid undue wear of the record groove in the disc at the starting point $c^2$, by repeated use of the disc, the sound record groove $c^1$ may be provided with a short outward extension thereof from the point $c^2$, as shown at $c^3$, such groove extension being arranged to merge gradually into the main sound record groove $c^1$. In this case, the stylus needle may be placed, for starting at a different point on the said groove extension $c^3$ each time the disc is to be used, so as to distribute any wear of the said grooved portion of the disc, due to the stylus needle, over the length of the groove extension $c^3$ which is so short in relation to the main record groove $c^1$ as not materially to interfere with proper synchronism of the voice record or records on the disc with the assumed speaking of the actor in the corresponding speaking section of film.

In Fig. 3 two gramophones, indicated at $f$ and $g$, for successive use as hereinbefore described, are arranged in proximity to the screen $h$ upon which the pictures in the sectionized picture film, indicated at $a^2$, are projected by the lantern $i$. The rotary table $k$ of each gramophone is driven through suitable speed reduction gearing from an electric motor $m$ connected to electric supply conductors $m^1$ $m^2$ through a starting resistance $m^3$ by a starting and stopping switch comprising movable and stationary contacts $n^1$ and $n$ respectively.

Having now particularly described and ascertained the nature of my said invention and in what manner the same is to be performed I declare that what I claim is:—

1. For use in combined cinematograph and phonograph production, a sectionized picture film comprising a succession of speaking sections as herein defined, provided with different numbers or letters, to serve as starting indications, and with characteristic symbols or marks differing from the numbers or letters and adapted to serve as stopping indications, each of the starting indications being arranged at the commencement of its speaking section and in front of the series of pictures in such section and each of the stopping indications being arranged at the terminal end of the speaking section and after the series of pictures in such section, the successive starting and stopping indications serving to indicate to an attendant, the times when each of a number of specially prepared voice record devices correspondingly numbered or lettered to the speaking sections and each adapted to produce sounds corresponding in kind and duration with those which an actor in the correspondingly numbered or lettered speaking section is supposed to be making, is to be started and stopped, so as to ensure synchronism between the assumed voice of the actor or actors in the successive speaking sections and the corresponding sound effects produced by the successive voice record devices, substantially as described.

2. A sectionized picture film as and for the purpose referred to in the preceding claim, made with successive speaking sections of varying length and numbered consecutively, substantially as described.

Signed at London, England, this eighth day of March, 1921.

ARTHUR THOMAS METCALF JOHNSON.